US011244312B2

(12) United States Patent
Kim

(10) Patent No.: US 11,244,312 B2
(45) Date of Patent: Feb. 8, 2022

(54) ONE-TIME ABSTRACTION CODING FOR RESOURCE DEPLOYMENT

(71) Applicant: BANK OF AMERICA CORPORATION, Charlotte, NC (US)

(72) Inventor: Andrew DongHo Kim, Glendale, AZ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 30 days.

(21) Appl. No.: 16/682,733

(22) Filed: Nov. 13, 2019

(65) Prior Publication Data

US 2021/0142322 A1   May 13, 2021

(51) Int. Cl.
| | |
|---|---|
| G06Q 30/00 | (2012.01) |
| G06Q 20/38 | (2012.01) |
| G06Q 30/02 | (2012.01) |
| G06Q 20/20 | (2012.01) |
| G06Q 20/10 | (2012.01) |
| H04W 12/06 | (2021.01) |

(52) U.S. Cl.
CPC ....... *G06Q 20/385* (2013.01); *G06Q 30/0226* (2013.01); *G06Q 20/1085* (2013.01); *G06Q 20/20* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 5,956,699 | A * | 9/1999 | Wong | G06Q 20/363 705/39 |
| 7,636,696 | B1 * | 12/2009 | Sigler, Jr. | G06Q 20/02 705/50 |
| 8,630,907 | B2 * | 1/2014 | Mardikar | G06Q 20/20 705/17 |
| 8,751,317 | B2 * | 6/2014 | Qawami | H04W 4/12 705/21 |
| 9,456,346 | B2 * | 9/2016 | Wang | H04L 67/42 |
| 9,646,300 | B1 * | 5/2017 | Zhou | G06Q 20/36 |
| 9,672,504 | B2 * | 6/2017 | Zito | G06Q 20/208 |
| 10,037,516 | B2 | 7/2018 | Mardikar et al. | |
| 10,360,547 | B2 | 7/2019 | Zito | |
| 10,748,140 | B1 * | 8/2020 | Maeng | H04W 4/80 |

(Continued)

OTHER PUBLICATIONS

Agrawal, Dhwani, et al. "Loyalty Points on the Blockchain." Business and Management Studies, vol. 4, No. 3, Sep. 2018 (Year: 2018).*

(Continued)

*Primary Examiner* — Luis A Brown
(74) *Attorney, Agent, or Firm* — Moore & Van Allen PLLC; Nicholas C. Russell

(57) ABSTRACT

Embodiments of the invention are directed to a system, method, or computer program product for generation, deployment, and execution of a one-time abstraction coding network for resource deployment. The system may provide a single use code for a single anonymous resource distribution at any location. The system may provide a user with access to a one-time abstraction code to use to complete a resource distribution for event processing. The system may link to the entity associated with the event to process resource distribution via a system owned resource vehicle for complete anonymity of the user.

15 Claims, 5 Drawing Sheets

(56) References Cited

U.S. PATENT DOCUMENTS

| | | | | |
|---|---|---|---|---|
| 10,785,214 | B2* | 9/2020 | Satija | H04L 63/0838 |
| 10,902,417 | B2* | 1/2021 | Cacioppo | G06Q 20/385 |
| 2005/0086177 | A1* | 4/2005 | Anderson | G06Q 20/3674 |
| | | | | 705/64 |
| 2010/0299266 | A1* | 11/2010 | Catania | G06Q 30/0238 |
| | | | | 705/71 |
| 2012/0028609 | A1* | 2/2012 | Hruska | H04W 12/02 |
| | | | | 455/411 |
| 2012/0036042 | A1* | 2/2012 | Graylin | G06Q 20/322 |
| | | | | 705/26.41 |
| 2012/0316992 | A1* | 12/2012 | Oborne | G06Q 20/386 |
| | | | | 705/26.41 |
| 2013/0054336 | A1* | 2/2013 | Graylin | G06Q 40/02 |
| | | | | 705/14.26 |
| 2015/0310425 | A1* | 10/2015 | Cacioppo | G06Q 20/385 |
| | | | | 705/64 |
| 2015/0339648 | A1* | 11/2015 | Kushevsky | G06Q 20/32 |
| | | | | 705/21 |
| 2015/0363781 | A1* | 12/2015 | Badenhorst | G06Q 20/385 |
| | | | | 705/44 |
| 2016/0078434 | A1* | 3/2016 | Huxham | G06Q 20/382 |
| | | | | 705/71 |
| 2016/0132880 | A1* | 5/2016 | O'Regan | G06Q 20/405 |
| | | | | 705/44 |
| 2016/0180368 | A1* | 6/2016 | Booth | G06Q 20/387 |
| | | | | 705/14.27 |
| 2016/0217464 | A1* | 7/2016 | Jajara | G06Q 20/4016 |
| 2016/0232518 | A1* | 8/2016 | Butler, IV | G06Q 20/204 |
| 2016/0239835 | A1* | 8/2016 | Marsyla | G06Q 20/3829 |
| 2016/0321653 | A1* | 11/2016 | Jacobs | G06Q 20/367 |
| 2016/0364743 | A1* | 12/2016 | St. Lawrence | G06Q 20/387 |
| 2017/0243195 | A1* | 8/2017 | Xing | G06K 9/00892 |
| 2018/0268403 | A1* | 9/2018 | Guglani | H04W 4/80 |
| 2019/0156388 | A1* | 5/2019 | Quentin | H04L 9/3236 |
| 2020/0034808 | A1* | 1/2020 | Kamat | G06Q 20/20 |

OTHER PUBLICATIONS

Blanco-Justicia, Alberto, et al. "Privacy-Preserving Loyalty Programs." Universitat Rovira, Tarragona, Catalonia, Dec. 2014. (Year: 2014).*

Enzmann, Matthias, Schneider, Markus. "Improving Customer Retention in E-Commerce through a Secure and Privacy-Enhanced Loyalty System." Information Systems Frontiers, vol. 7: 4/5, pp. 359-370, 2005. (Year: 2005).*

* cited by examiner

ONE-TIME ABSTRACTION CODING FOR RESOURCE DEPLOYMENT

BACKGROUND

In the technology landscapes, users regularly provide information to entities for resource distribution. That being said, this information may be critical for user protection. As such, there exists a need for an abstraction coding network for resource deployment.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

In some embodiments, the invention provides for a one-time abstraction coding system for resource deployment. The system may provide a single use code for a single resource distribution at any location. The system may provide a user with access to a one-time abstraction code to use to complete a resource distribution at a merchant. In this way, the user may select one or more resource distribution methods to be associated with the one-time abstraction code. The system may generate the one-time abstraction code for the selected resource distribution method. Upon completion of the event, the user may input the one-time abstraction code into the merchant resource acceptance device to complete the distribution. The system may link to the merchant to provide the appropriate resources for completion of the distribution in real-time. This way providing complete anonymity to the user relative to the merchant.

Furthermore, the system can integrate with a digital identification via the user's mobile device in order to provide security and authentication for the user. The system may then create a back end identification program to provide merchants with loyalty information of the user using the one time code. In this way, the merchant may be able to build a loyalty relationship with the user without knowing the user's identity.

In some embodiments, the invention creates a one-time abstraction code that the user sets up beforehand. At the point of sale, the user never presents a resource distribution instrument, such as a credit card. The user inputs the one-time abstraction code at the merchant location and the system comments via bank end communication linkages to match that to an account for the payment.

Embodiments of the present invention address these and/or other needs by providing an innovative system, method and computer program product for one-time abstraction coding for resource deployment, the invention comprising: extracting user resource vehicles for association with a one-time abstraction code and storing the association within a one-time abstraction code depository; deploying the one-time abstraction code to a user; identifying the one-time abstraction code being input at a resource acceptance device associated with an entity for completion of a user interaction event with the entity; creating a communicable linkage with the resource acceptance device associated with the entity; transmitting resources from a system owned resource vehicle for completion of the user interaction event; and reconciling resources from the user resource vehicles with the system owned resource vehicle for anonymous resource deployment during the user interaction event.

In some embodiments, creating the communicable linkage with the resource acceptance device associated with the entity further comprises receiving a resource amount required for completion of the user interaction event with the entity.

In some embodiments, identifying the one-time abstraction code being input at a resource acceptance device associated with an entity further comprises receiving a communication from a user device or the resource acceptance device indicating deployment of the one-time abstraction code. In some embodiments, communication instructions are embedded within the one-time abstraction code and trigger a communication response upon input at the resource acceptance device In some embodiments, reconciling resources from the user resource vehicles with the system owned resource vehicle further comprises applying a loyalty account for the user to the entity for obtaining credit for the user interaction event.

In some embodiments, extracting user resource vehicles for association with the one-time abstraction code further comprises extracting user loyalty vehicles associated with entities and storing the user loyalty vehicles in association within the one-time abstraction code depository.

In some embodiments, extracting user resource vehicles for association with a one-time abstraction code and storing the association within a one-time abstraction code depository further comprises enrolling the user in the one-time abstraction coding for resource deployment and identifying user inputted criteria and threshold for each one-time abstraction code generated.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
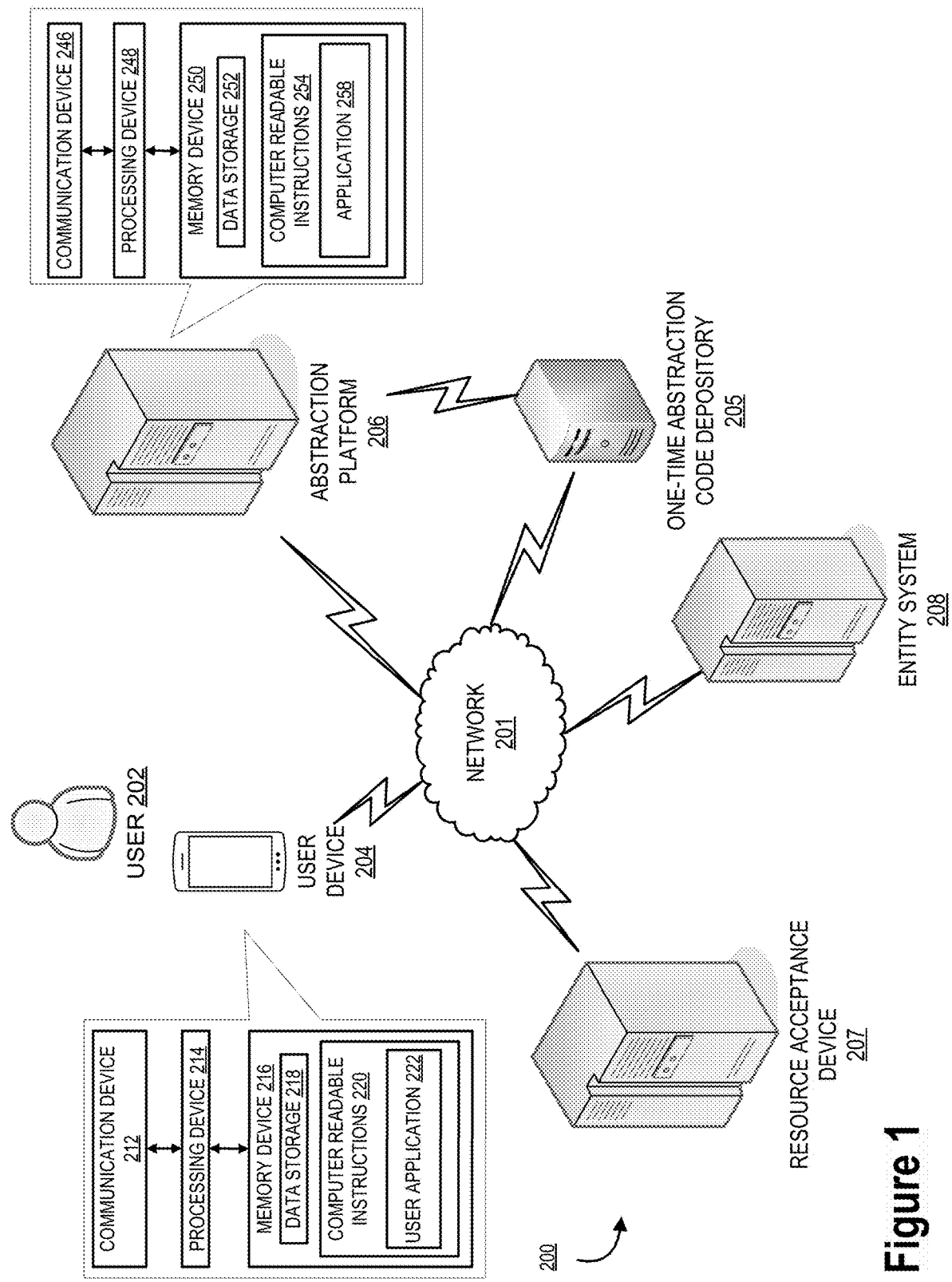
Figure 2:
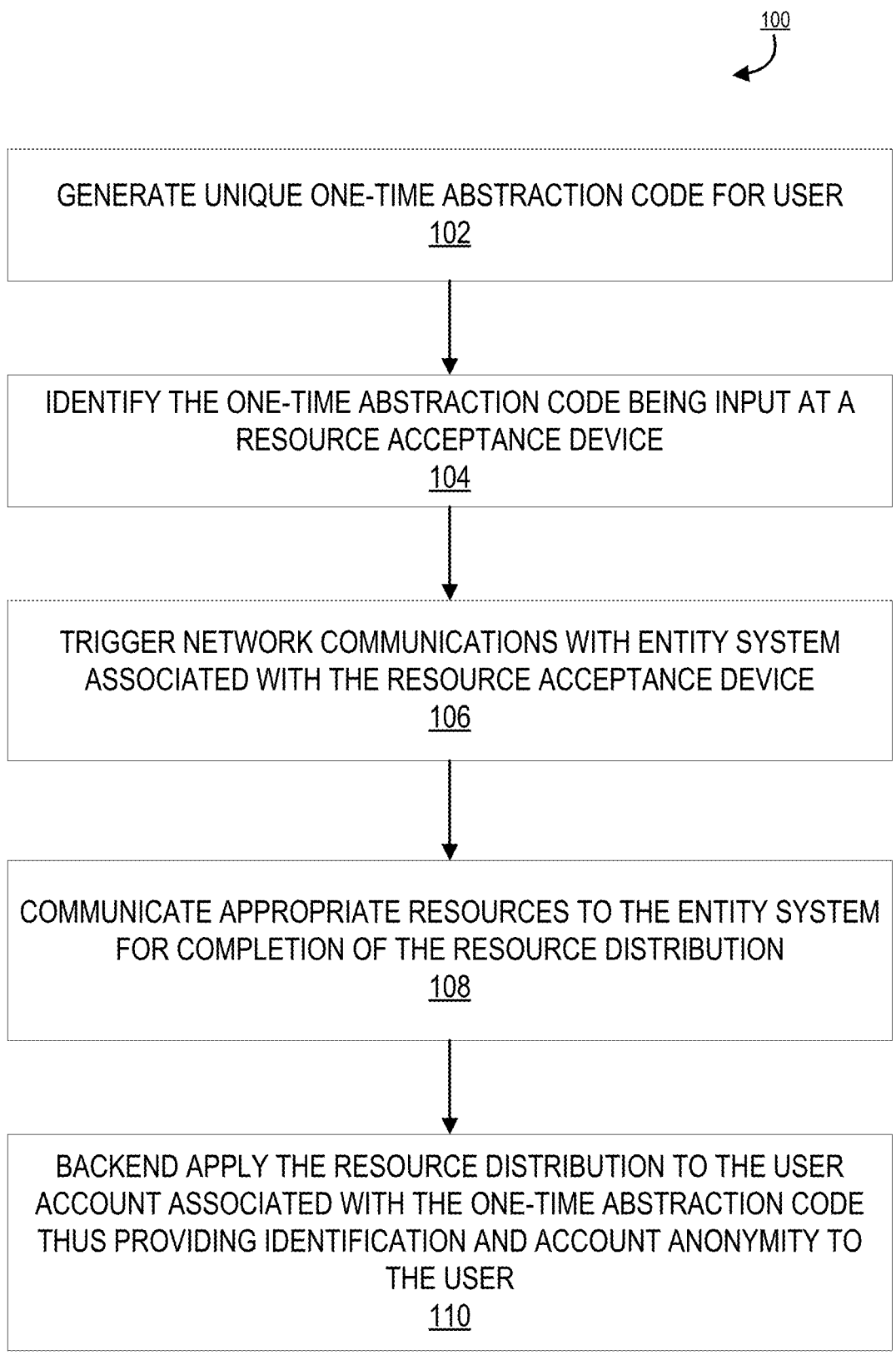
Figure 3:
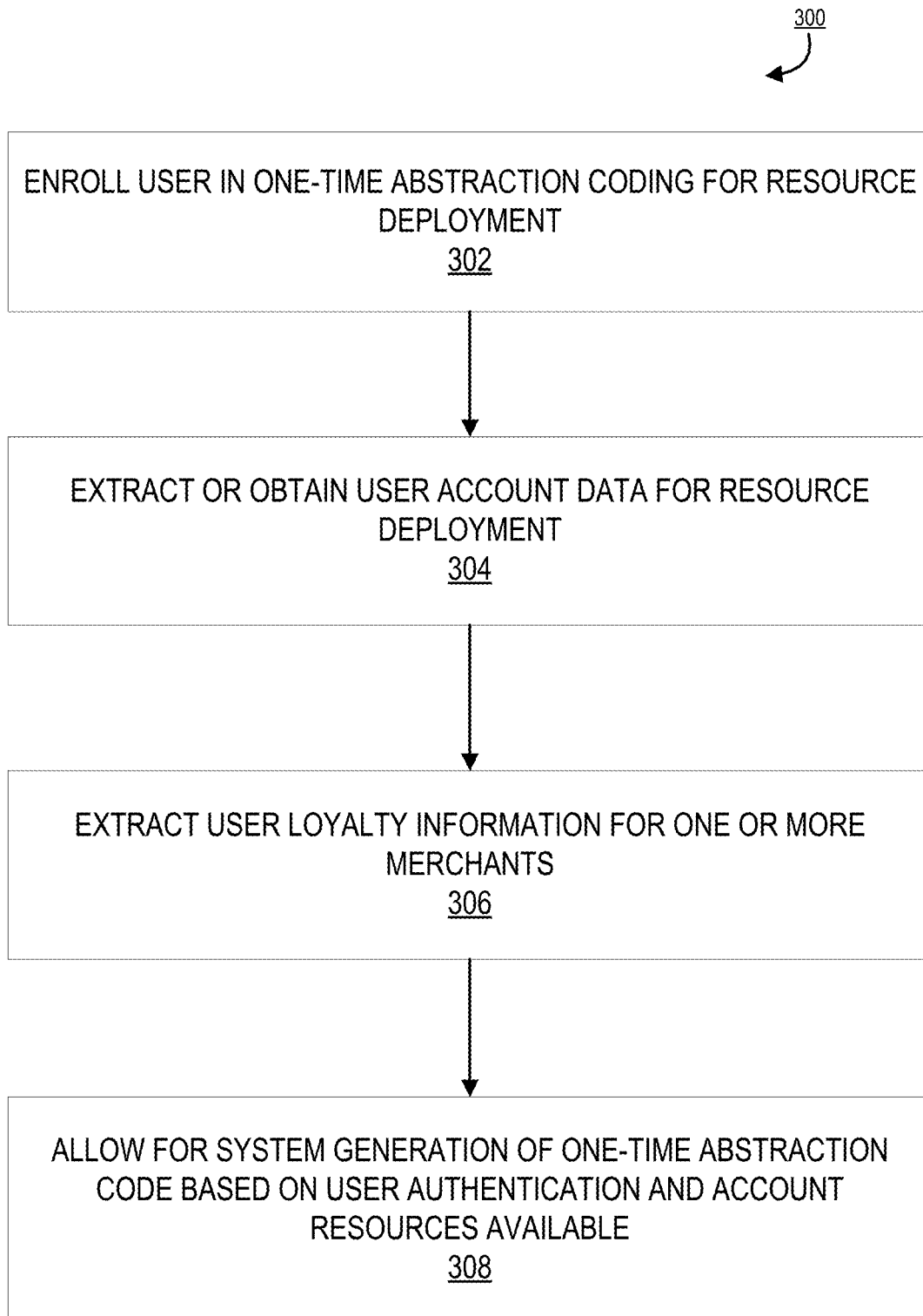
Figure 4:
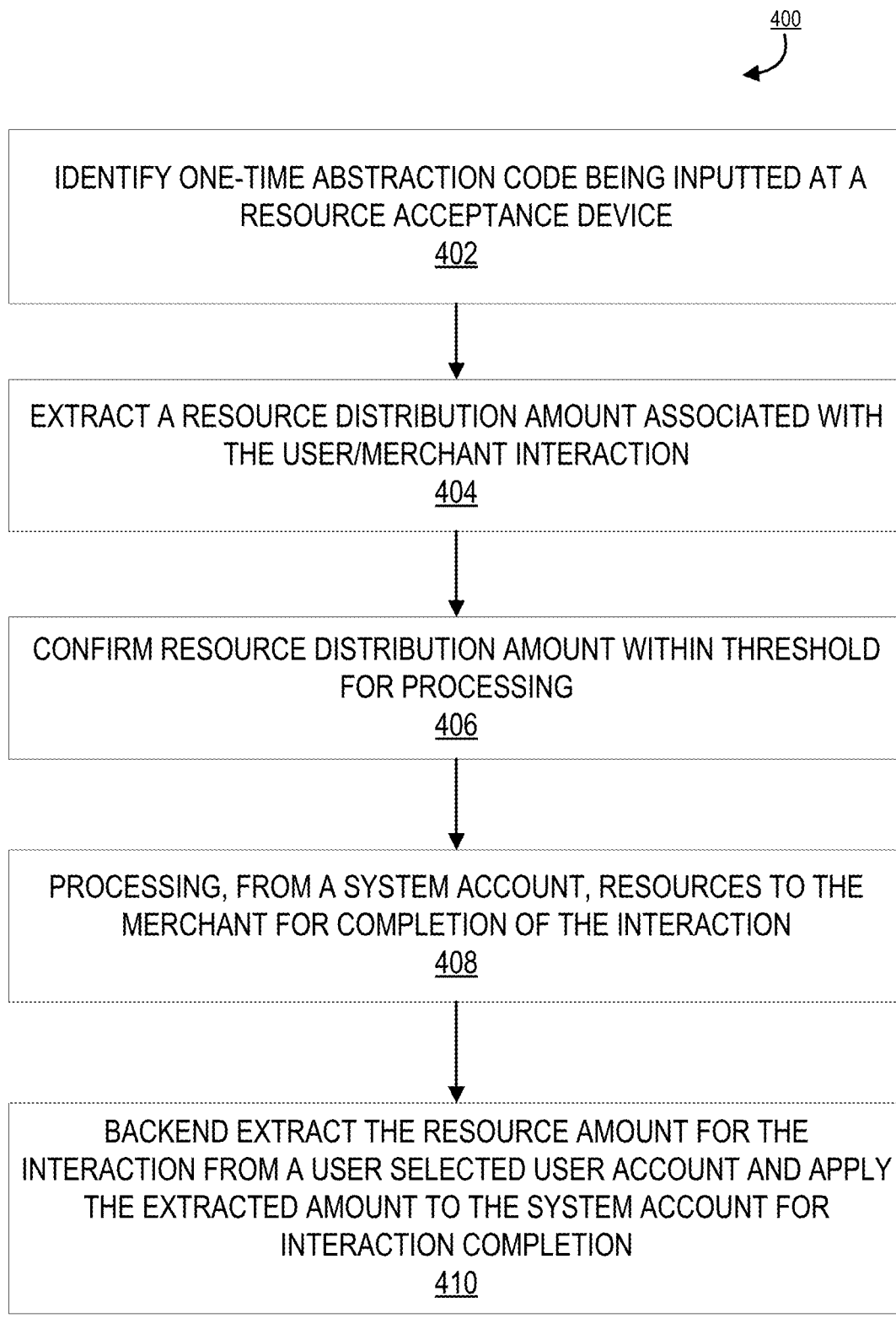
Figure 5:
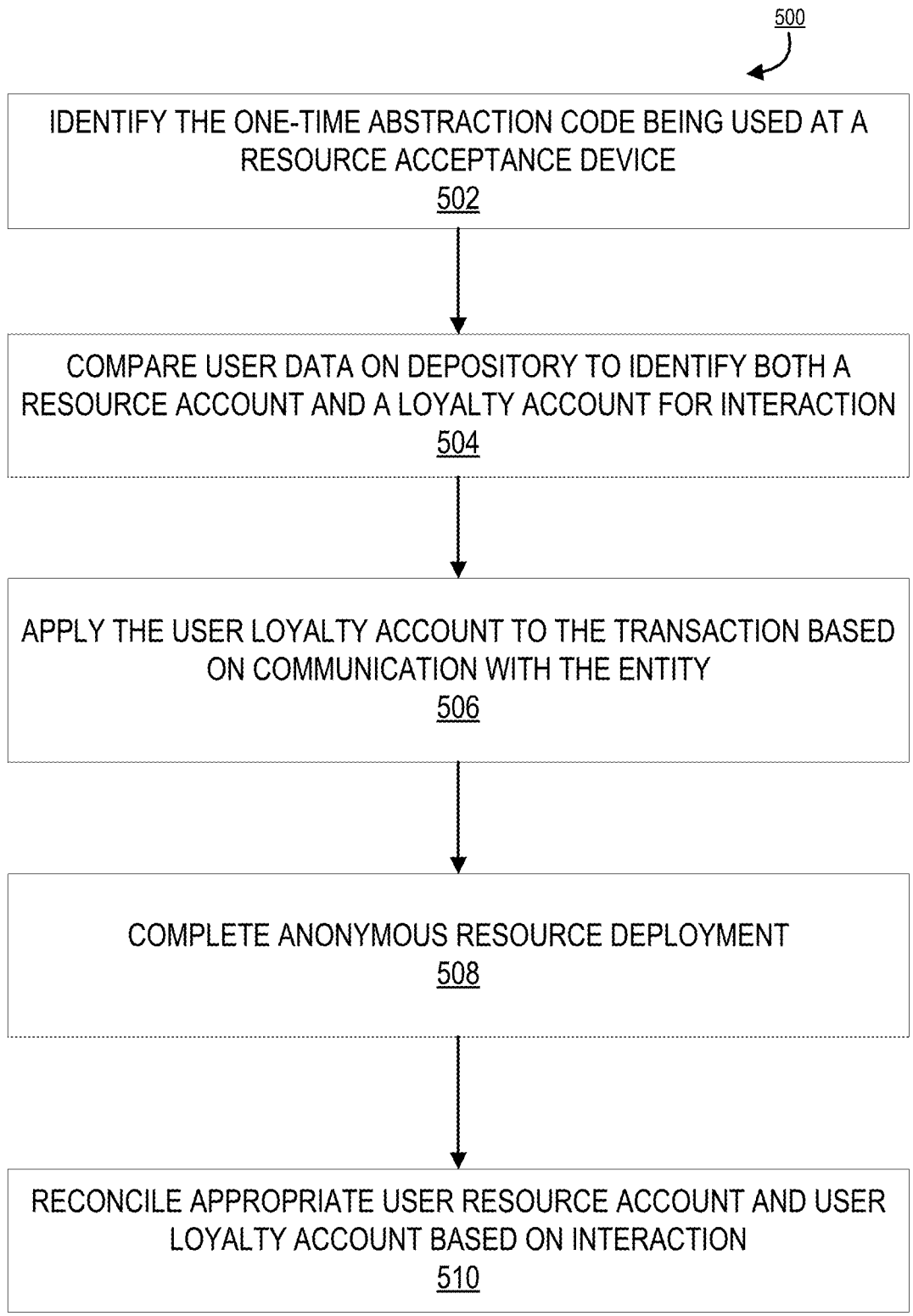

Having thus described embodiments of the invention in general terms, reference will now be made to the accompanying drawings, wherein:

FIG. 1 provides a one-time abstraction coding system environment, in accordance with one embodiment of the present invention;

FIG. 2 provides a high level process flow illustrating one-time abstraction code generation and deployment, in accordance with one embodiment of the present invention;

FIG. 3 provides a process flow illustrating enrollment and initiation of a user into the one-time abstraction coding system, in accordance with one embodiment of the present invention;

FIG. 4 provides a process flow illustrating processing of a one-time abstraction code for resource distribution, in accordance with one embodiment of the present invention; and FIG. 5 provides a process flow illustrating resource and loyalty account reconciliation via the one-time abstraction coding for resource deployment system, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "user" as used herein may refer to any customer of a merchant or individual that interacts with a merchant. The user may interact with a merchant as a customer, such as a customer purchasing a product or service. Furthermore, as used herein the term "user device" or "mobile device" may refer to mobile phones, personal computing devices, tablet computers, wearable devices, and/or any portable electronic device capable of receiving and/or storing data therein.

As used herein, a "user interface" generally includes a plurality of interface devices and/or software that allow a customer to input commands and data to direct the processing device to execute instructions. For example, the user interface may include a graphical user interface (GUI) or an interface to input computer-executable instructions that direct the processing device to carry out specific functions. Input and output devices may include a display, mouse, keyboard, button, touchpad, touch screen, microphone, speaker, LED, light, joystick, switch, buzzer, bell, and/or other user input/output device for communicating with one or more users.

As used herein, the term "resource" may refer to electronic data or an exchangeable currency having a value (e.g., funds) or the like. A computing resource may refer to elements of one or more computing devices (e.g., processor, memory, communication device, and the like) networks, or the like available to be used in the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison). As used herein, a "resource vehicle" may refer to any medium for resource conveyance from one resource location to another. For example, a resource vehicle may comprise a credit or debit card, a check, a wire transfer, a gift card, or the like. In one embodiment, a resource vehicle may comprise a data transfer mechanism or device (e.g., a thumb drive or other removable data storage).

As used herein, an "interaction" or "connection" may refer to any communication between one or more users and a merchant or systems within the system environment described herein. For example, an interaction may refer to a transfer or exchange of resources (e.g., data, information, funds, and the like) between systems, devices, and/or application; an accessing of stored data by one or more devices; a transmission of a requested task; a sharing or leveraging of resources (e.g., computing resources) between device; or the like. An interaction may include user interactions with a user interface (e.g., clicking, swiping, text or data entry, and the like), authentication actions (e.g., signing-in, username and password entry, PIN entry, and the like), account actions (e.g., account access, fund transfers, and the like) and the like. In a specific embodiment, an "interaction" may refer to a resource transfer executed between one or more users and/or entities (e.g., a transaction).

As used herein, the term "entity" may be used to include any merchant that the user may interact with to complete a transaction. The terms "financial institution" and "financial entity" may be used to include any organization that processes financial transactions including, but not limited to, banks, credit unions, savings and loan associations, investment companies, stock brokerages, management firms, insurance companies and the like. In other embodiments, an entity may be a business, organization, a government organization or the like that is not a financial institution. In a specific embodiment, an entity is a resource providing entity such as a financial institution that provides a resource vehicle and/or location (e.g., a credit card and associated account) to a user. The resource vehicle and/or location may include supplementary resources.

As used herein, "authentication information" may refer to any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system.

A "resource distribution" refers to any transaction or communication between a user and either an entity or the financial institution to transfer funds for the purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

In various embodiments, the resource acceptance device may be a resource acceptance device that may be or include a merchant machine and/or server and/or may be or include the mobile device of the user may function as a point of transaction device. The embodiments described herein may refer to the use of a transaction, transaction event or point of transaction event to trigger the steps, functions, routines and the like described herein. In various embodiments, occurrence of a transaction triggers the sending of information such as alerts and the like. As further examples, a transaction may occur when an entity associated with the user is alerted via the transaction of the user's location. A transaction may occur when a user accesses a building, uses a rewards card, and/or performs an account balance query. A transaction may occur as a user's mobile device establishes a wireless connection, such as a Wi-Fi connection, with a point-of-sale terminal. In some embodiments, a transaction may include one or more of the following: purchasing, renting, selling, and/or leasing goods and/or services (e.g., groceries, stamps, tickets, DVDs, vending machine items, and the like); withdrawing cash; making payments; sending remittances; transferring balances from one account to another account; loading money onto stored value cards (SVCs) and/or prepaid cards; donating to charities; and/or the like.

In some embodiments, the transaction or resource distribution may refer to an event and/or action or group of actions facilitated or performed by a user's device, such as a user's mobile device. Such a device may be referred to herein as a "resource acceptance device". A "point-of-transaction" could refer to any location, virtual location or otherwise proximate occurrence of a transaction or resource distribution. A "resource acceptance device" may refer to any device used to perform a transaction, either from the user's perspective, the merchant's perspective or both. In some embodiments, the resource acceptance device refers only to a user's device, in other embodiments it refers only to a merchant device, and in yet other embodiments, it refers to both a user device and a merchant device interacting to perform a transaction. For example, in one embodiment, the resource acceptance device refers to the user's mobile device configured to communicate with a merchant's point of sale terminal, whereas in other embodiments, the resource acceptance device refers to the merchant's point of sale terminal configured to communicate with a user's mobile device, and in yet other embodiments, the resource acceptance device refers to both the user's mobile device and the merchant's point of sale terminal configured to communicate with each other to carry out a transaction.

In some embodiments, a resource acceptance device is or includes an interactive computer terminal that is configured to initiate, perform, complete, and/or facilitate one or more transactions. A resource acceptance device could be or include any device that a user may use to perform a transaction with an entity, such as, but not limited to, an ATM, a loyalty device such as a rewards card, loyalty card or other loyalty device, a magnetic-based payment device (e.g., a credit card, debit card, and the like), a personal identification number (PIN) payment device, a contactless payment device (e.g., a key fob), a radio frequency identification device (RFID) and the like, a computer, (e.g., a personal computer, tablet computer, desktop computer, server, laptop, and the like), a mobile device (e.g., a smartphone, cellular phone, personal digital assistant (PDA) device, MP3 device, personal GPS device, and the like), a merchant terminal, a self-service machine (e.g., vending machine, self-checkout machine, and the like), a public and/or business kiosk (e.g., an Internet kiosk, ticketing kiosk, bill pay kiosk, and the like), and/or various combinations of the foregoing.

In some embodiments, a resource acceptance device is operated in a public place (e.g., on a street corner, at the doorstep of a private residence, in an open market, at a public rest stop, and the like). In other embodiments, the resource acceptance device is additionally or alternatively operated in a place of business (e.g., in a retail store, post office, banking center, grocery store, factory floor, and the like). In accordance with some embodiments, the resource acceptance device is not owned by the user of the resource acceptance device. Rather, in some embodiments, the resource acceptance device is owned by a mobile business operator or a point-of-transaction operator (e.g., merchant, vendor, salesperson, and the like). In yet other embodiments, the resource acceptance device is owned by the financial institution offering the resource acceptance device providing functionality in accordance with embodiments of the invention described herein.

Further, the term "resource vehicle," as used herein, may refer to any of, but is not limited to refers to any of, but is not limited to, a physical, electronic (e.g., digital), or virtual transaction vehicle that can be used to transfer money, make a payment (for a service or good), withdraw money, redeem or use loyalty points, use or redeem coupons, gain access to physical or virtual resources, and similar or related transactions. For example, in some embodiments, the payment vehicle is a bank card issued by a bank which a user may use to perform purchase transactions. However, in other embodiments, the payment vehicle is a virtual debit card housed in a mobile device of the user, which can be used to electronically interact with an automated teller machine (ATM) or the like to perform financial transactions. Thus, it will be understood that the payment vehicle can be embodied as an apparatus (e.g., a physical card, a mobile device, or the like), or as a virtual transaction mechanism (e.g., a digital transaction device, digital wallet, a virtual display of a transaction device, or the like).

In some embodiments, information associated with the purchase transaction is received from a resource acceptance device including a point-of-sale (POS) terminal during a transaction involving a user and a merchant. For example, a user checking out at a retail merchant, such as a grocer, may provide to the grocer the one or more goods or products that the user is purchasing together with a payment method, loyalty card, and possibly personal information, such as the name of the consumer.

In some embodiments, the invention provides for a one-time abstraction coding system for resource deployment. The system may provide a single use code for a single resource distribution at any location. The system may provide a user with access to a one-time abstraction code to use to complete a resource distribution at a merchant. In this way, the user may select one or more resource distribution methods to be associated with the one-time abstraction code. The system may generate the one-time abstraction code for the selected resource distribution method. Upon completion of the event, the user may input the one-time abstraction code into the merchant resource acceptance device to complete the distribution. The system may link to the merchant to provide the appropriate resources for completion of the distribution in real-time. This way providing complete anonymity to the user relative to the merchant.

Furthermore, the system can integrate with a digital identification via the user's mobile device in order to provide security and authentication for the user. The system may then create a back end identification program to provide merchants with loyalty information of the user using the one time code. In this way, the merchant may be able to build a loyalty relationship with the user without knowing the user's identity.

In some embodiments, the invention creates a one-time abstraction code that the user sets up beforehand. At the point of sale, the user never presents a resource distribution instrument, such as a credit card. The user inputs the one-time abstraction code at the merchant location and the system comments via bank end communication linkages to match that to an account for the payment.

FIG. 1 provides a one-time abstraction coding system environment 200, in accordance with one embodiment of the present invention. FIG. 1 provides the system environment 200 for which the distributive network system with specialized data feeds associated with an interconnected resource distribution and retention network. FIG. 1 provides a unique system that includes specialized servers and system communicably linked across a distributive network of nodes required to perform the functions described herein.

As illustrated in FIG. 1, the entity system 208 is operatively coupled, via a network 201 to the user device 204, one-time abstraction code depository 205, resource acceptance device 207, and to the abstraction platform 206. In this way, the entity system 208 can send information to and receive information from the user device 204, resource acceptance device 207, and the abstraction platform 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual or entity that has one or more user devices 204. The user 202 may be a customer of an entity or third party merchant associated with the entity system 208 and/or the resource acceptance device 207. The user 202 may wish to complete a transaction with the entity or third party. In some embodiments, the user 202 has a user device, such as a mobile phone, tablet, computer, or the like. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the abstraction platform 206, the entity system 208, and the third party sever 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to send and receive communications with the abstraction platform 206.

As further illustrated in FIG. 1, the abstraction platform 206 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the entity system 208, the resource acceptance device 207, the one-time abstraction code depository 205, and the user device 204. As such, the communication device 246 generally comprises a modem, server, or other device for communicating with other devices on the network 201.

As further illustrated in FIG. 1, the abstraction platform 206 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the abstraction platform 206 the memory device 250 stores an application 258. In one embodiment of the invention, the application 258 may associate with applications having computer-executable program code. Furthermore, the abstraction platform 206, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more entity system 208, resource acceptance device 207, one-time abstraction code depository 205, and/or user device 204.

As illustrated in FIG. 1, the resource acceptance device 207 is connected to the entity system 208, user device 204, one-time abstraction code depository 205, and abstraction platform 206. The resource acceptance device 207 has the same or similar components as described above with respect to the user device 204 and the abstraction platform 206. While only one resource acceptance device 207 is illustrated in FIG. 1, it is understood that multiple resource acceptance device 207 may make up the system environment 200. The resource acceptance device 207 may be associated with one or more financial institutions, entities, or the like and function as a point-of-sale device or point-of-transaction device for the user to interact with in order to complete a transaction with the merchant.

As illustrated in FIG. 1, the one-time abstraction code depository 205 is connected to the abstraction platform 206. The one-time abstraction code depository 205 has the same or similar components as described above with respect to the user device 204 and the abstraction platform 206. While only one one-time abstraction code depository 205 is illustrated in FIG. 1, it is understood that multiple one-time abstraction code depository 205 may make up the system environment 200.

The one-time abstraction code depository 205 stores one-time abstraction codes, loyalty information associated with users, accounts associated with the one-time abstraction codes, and the like. In this way, the one-time abstraction code depository 205 may store step by step instructions for applying resources for completion of a transaction with a merchant.

The one-time abstraction code depository 205 may be connected to the abstraction platform 206 via the network 201 for the abstraction platform 206 to perform a search of the one-time abstraction code depository 205 for identification of a specific one-time code for user presentment and usage. Furthermore, the one-time abstraction code depository 205 may communicate with the same network protocol and compatibility with the user device 204 for deployment of the codes to the user 202.

As illustrated in FIG. 1, the entity system 208 is connected to the resource acceptance device 207, user device 204, one-time abstraction code depository 205, and abstraction platform 206. The entity system 208 may be associated with a merchant and the resource acceptance device 207. The entity system 208 has the same or similar components as described above with respect to the user device 204 and the abstraction platform 206. While only one entity system 208 is illustrated in FIG. 1, it is understood that multiple entity system 208 may make up the system environment 200. It is understood that the servers, systems, and devices described herein illustrate one embodiment of the invention. It is further understood that one or more of the servers, systems, and devices can be combined in other embodiments and still function in the same or similar way as the embodiments described herein. The entity system 208 may generally include a processing device communicably coupled to devices as a memory device, output devices, input devices, a network interface, a power source, one or more chips, and the like. The entity system 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like. The memory device may store any of a number of applications or programs which comprise computer-executable instructions/code executed by the processing device to implement the functions of the entity system 208 described herein.

FIG. 2 provides a high level process flow illustrating one-time abstraction code generation and deployment 100, in accordance with one embodiment of the present invention. As illustrated in block 102, the process 100 is initiated by the generation of a unique one-time abstraction code for a user. In this way, a user may request a one-time abstraction code. The user, via the request may provide one or more parameters to the code. These parameters may be based on an amount of resources, the code may be associated with a particular user account, the code may be for a particular merchant, the code may have a start or end time, the code may be for a specific location, or the like. Upon request of the one-time abstraction code the user may determine and set the parameters for the code.

The user or an authorized associate of the user may be using the one-time abstraction code at an entity location to complete a transaction with the entity. In this way, the user may be purchasing products or services at the merchant location and wishing to distribute resources to the merchant using the one-time abstraction code. The user may desire this situation because the system provides complete anonymity to the user with respect to the merchant. As such, the merchant will never gain access to the user's name, identity, resource distribution account numbers, or the like. Thus providing a secure transaction environment for the user.

As such, the user may input the one-time abstraction code at the merchant's resource acceptance device. For example, the user may input the one-time abstraction code at a merchant point of sale, such as at a food truck location or the like.

As illustrated in block 104, the process 100 continues by identifying the one-time abstraction code being inputted at the resource acceptance device associated with the merchant. This way, the user may input the one-time abstraction code at a resource acceptance device at a merchant location. The user may manually input the one-time abstraction code at the resource acceptance device, the user may swipe a vehicle, such as a card, that includes an embedded or encoded one-time abstraction code at the resource acceptance device, the user may use an NFC reader or the like to transmit from the user device to the resource acceptance device the one-time abstraction code. As such, the user may transmit the one-time abstraction code to the resource acceptance device associated with the merchant to complete a transaction for goods and/or services at the merchant location.

As illustrated in block 106, the input of the one-time abstraction code at the resource acceptance device of the merchant triggers a network communication linkage between the system and the merchant system. The merchant system may include any entity system and/or the resource acceptance device. The network communication linkage may link the system with the merchant such that the system may be able to provide the merchant with resources on the user's behave to complete the transaction for the user. In this way, the communication linkage may present the system with an amount of resources required for the transaction from the merchant such that the system may be able to transmit those resources directly from system controlled resources to the merchant for transaction completion.

As illustrated in block 108, the process 100 continues by communicating the appropriate resources to the entity system for completion of the resource distribution. In this way, once the communicable linkage between the system and the merchant has been made, the merchant may be able to complete the transaction with the system. As such, the merchant system may transmit to the abstraction platform a resource amount required to be distributed to complete the user transaction with the merchant. Using resources stored within a system account not associated with the user, the system may transmit the appropriate resources to the entity system for completion of the user's transaction.

As such, the system may complete the transaction for the user such that the user done not need to provide any personal information to the merchant. The user may provide the one-time abstraction code to the merchant and the system may complete the transaction using system associated accounts and resources. This way providing an anonymous transaction process for a user.

Finally, as illustrated in block 110, the process 100 is completed by the system performing a backend application for the resource distribution to the user account associated with the one-time abstraction code, thus providing identification and account anonymity to the user. In this way, the system may replace the resources stored within a system account that were used to complete the transaction with resources from a user selected account.

FIG. 3 provides a process flow illustrating enrollment and initiation of a user into the one-time abstraction coding system 300, in accordance with one embodiment of the present invention. As illustrated in block 302, the process 300 is initiated by enrolling a user in the one-time abstraction coding for resource deployment system. As such, a user may sign into or otherwise register to receive one-time abstraction codes for the completion of transactions with merchants such that the user may remain anonymous during the transaction process. Once registered, the system may extract or obtain user account data associated with user resource deployments, as illustrated in block 304. This account data may include credit card accounts, checking accounts, debit accounts, savings accounts, or the like that the user may utilize to complete a transaction with a merchant.

Once the user account data is identified and stored for user utilization for the transaction, the process 300 may continue by further setting up the user for the one-time abstraction coding for resource deployment system by extracting user loyalty information for one or more merchants, as illustrated in block 306. In this way, when a user utilizes a one-time abstraction code at a merchant, the system may be able to check to identify if a user has a loyalty account associated with the merchant. If so, the system may be able to communicate the loyalty information to the merchant along with the one-time abstraction code for completion of the transaction and for accruement of loyalty points for the transaction to the user's loyalty account associated with the merchant.

As illustrated in block 308, the set up process 300 is completed by allowing for system generation of one-time abstraction codes based on user authentication and account resource availability. In this way, when the user is desiring to transact with a merchant, the user may log into the one-time abstraction coding system and request a one-time abstraction code for the transaction. Furthermore, the user may identify the user account the user wishes to complete the transaction with. At that point the system may confirm resource availability in the account and provide the user with the one-time abstraction code for use. In addition, the user may be able to set parameters around the use of the one-time abstraction code. These may include time limit, resource limits, specific merchants, or the like. As such, when a one-time abstraction code is being used within the parameters, the system may allow the processing of the transaction. However, if the one-time abstraction code is being used outside the parameters, the system may deny the transaction processing with the merchant using that specific one-time abstraction code.

FIG. 4 provides a process flow illustrating processing of a one-time abstraction code for resource distribution 400, in accordance with one embodiment of the present invention. As illustrated in block 402, the process 400 is initiated by identifying a provided one-time abstraction code being inputted at a resource acceptance device of a merchant. In this way, the user may input the one-time abstraction code at a resource acceptance device of a merchant, such as at a POS device at a merchant location. The one-time abstraction code may be manually inputted by the user, scanned from the user device, or otherwise provided via card, scan, chip, or touch communication technology. The input of the one-time abstraction code may initiate a communication linkage between the system and the merchant. This communication linkage may be between the system abstraction platform and the resource acceptance device and/or the entity system associated with the merchant.

The communication linkage allows for the system to complete the transaction with the merchant on behalf of the user. As such, other than providing the one-time abstraction code, the user does not need to provide any other personal or payment information.

Next, as illustrated in block 404, the process 400 continues by extracting a resource distribution amount required for the user merchant interaction. In this way, the system may communicate with the merchant during the transaction to identify an amount of resources required to complete the transaction. The amount of resources may include the amount to purchase the products and/or services the user is transacting for with the merchant.

As illustrated in block 406, once the amount of resources required by the merchant to complete the transaction is transmitted, the system may confirm that that resource distribution amount is within a threshold for processing the transaction. In this way, the system may confirm that the user has approved that resource distribution amount for the particular one-time abstraction code being used and that the user account associated with the one-time abstraction code being used has appropriate resources for the resource distribution amount.

Next, as illustrated in block 408, the process 400 continues by processing, from a system owned account, resources to the merchant for completion of the interaction. In this way, upon confirmation of the one-time abstraction code, confirmation of the threshold being met, and the like. The system may then transmit resources in the amount of the transaction to complete the transaction for the user using system controlled resources not associated with the user.

Upon transmission of the resources from a system controlled resource vehicle to the merchant for completion of the transaction, the user and merchant may complete the transaction by the merchant providing the goods or services for the completion of the transaction based on the receiving of resources from the system controlled resource vehicle.

As illustrated in block 410, the process 400 is completed by performing a backend extraction of the resource amount required for completion of the interaction between the merchant and the user from the user selected user account and apply that resource amount to the system resource vehicle used to complete the transaction with the merchant. In this way, the system may extract resources from the user account to reconcile the system account that was used to provide payment to the merchant to complete the transaction between the merchant and the user.

FIG. 5 provides a process flow illustrating resource and loyalty account reconciliation via the one-time abstraction coding for resource deployment system 500, in accordance with one embodiment of the present invention. As illustrated in block 502, the process 500 is initiated by identifying the user of a one-time abstraction code at a resource acceptance device. In this way, a user may be initiating the completion of a transaction with a merchant at a merchant's resource acceptance device. The user may be utilizing a one-time abstraction code to provide resources to the merchant for completion of the transaction.

As illustrated in block 504, the process 500 continues by comparing user data on the depository to identify both a resource account and a loyalty account for the interaction. In this way, the system may identify the user account or user resource vehicle that the user has selected to be associated with the presented one-time abstraction code. Furthermore, the system may be able to recognize and identify the merchant of the transaction based on the communication linkage established when the one-time abstraction code was input. The system may identify if the user has an existing loyalty account with the merchant and allow for application of the transaction to the loyalty account.

Next, as illustrated in block 506, the system may apply the identified loyalty account to the transaction based on the communication with the merchant. In this way, the system may apply the transaction to a user's loyalty account for the merchant such that the user gets credit for the transaction. Once applied, the system may continue to use a system owned resource vehicle to complete the anonymous resource deployment, as illustrated in block 508. Finally, as illustrated in block 510, once the anonymous resource deployment has been completed and the transaction has been completed, the system may be able to backend apply and reconcile the appropriate user resource account and user loyalty account based on the completion of the transaction.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for one-time abstraction coding for resource deployment, the system comprising:
    a memory device with computer-readable program code stored thereon;
    a communication device, wherein the communication device is configured to establish operative communication with a plurality of networked devices via a communication network;
    a processing device operatively coupled to the memory device and the communication device, wherein the processing device is configured to execute the computer-readable program code to:
        extract user resource vehicles for association with a one-time abstraction code and storing store the association within a one-time abstraction code depository;
        enroll a user in the one-time abstraction coding for resource deployment and identifying user inputted criteria and threshold for each one-time abstraction code generated, wherein the user inputted criteria comprises a selection of a user account by the user:
        deploy the one-time abstraction code to the user;
        gather authentication information from the user on a user device;
        receive a communication indicating deployment of the one-time abstraction code;
        identify the one-time abstraction code being input by the user at a resource acceptance device associated with an entity for completion of a user interaction event with the entity;
    create a communicable linkage with the resource acceptance device associated with the entity;
        identify the entity of the user interaction event based on the communication linkage from the input of the one-time abstraction code, and anonymously identify that the user has a loyalty account with the entity, wherein anonymously identifying comprises using a back end identification program to match the one-time abstraction code to the loyalty account associated with the entity;
        transmit resources from a system owned resource vehicle for completion of the user interaction event;
        apply the loyalty account to the user interaction event; and
        reconcile resources from the user resource vehicles with the system owned resource vehicle and apply loyalty points to the loyalty account of the user for resource deployment during the user interaction event, wherein the user is anonymous to the resource acceptance device.

2. The system of claim 1, wherein creating the communicable linkage with the resource acceptance device associated with the entity further comprises receiving a resource amount required for completion of the user interaction event with the entity.

3. The system of claim 1, wherein communication instructions are embedded within the one-time abstraction code and trigger a communication response upon input at the resource acceptance device.

4. The system of claim 1, wherein receiving the communication indicating deployment of the one-time extraction code further comprises receiving the communication from the user device.

5. The system of claim 1, wherein receiving the communication indicating deployment of the one-time extraction code further comprises receiving the communication from the resource acceptance device.

6. A computer program product for one-time abstraction coding for resource deployment, the computer program product comprising at least one non-transitory computer-readable medium having computer-readable program code portions embodied therein, the computer-readable program code portions comprising:
    an executable portion configured for extracting user resource vehicles for association with a one-time abstraction code and storing the association within a one-time abstraction code depository;
    an executable portion configured for enrolling a user in the one-time abstraction coding for resource deployment and identifying user inputted criteria and threshold for each one-time abstraction code generated, wherein the user inputted criteria comprises a selection of a user account by the user;
    an executable portion configured for deploying the one-time abstraction code to the user;
    an executable portion configured for gathering authentication information from the user on a user device;
    an executable portion configured for receiving a communication indicating deployment of the one-time abstraction code;
    an executable portion configured for identifying the one-time abstraction code being input by the user at a resource acceptance device associated with an entity for completion of a user interaction event with the entity;
    an executable portion configured for creating a communicable linkage with the resource acceptance device associated with the entity;
    an executable portion configured for identifying the entity of the user interaction event based on the communication linkage from the input of the one-time abstraction code, and anonymously identify that the user has a loyalty account with the entity, wherein anonymously identifying comprises using a back end identification program to match the one-time abstraction code to the loyalty account associated with the entity;
    an executable portion configured for transmitting resources from a system owned resource vehicle for completion of the user interaction event;
    an executable portion configured for applying the loyalty account to the user interaction event; and
    an executable portion configured for reconciling resources from the user resource vehicles with the system owned resource vehicle and apply loyalty points to the loyalty account of the user for resource deployment during the user interaction event, wherein the user is anonymous to the resource acceptance device.

7. The computer program product of claim 6, wherein creating the communicable linkage with the resource acceptance device associated with the entity further comprises receiving a resource amount required for completion of the user interaction event with the entity.

8. The computer program product of claim 6, wherein communication instructions are embedded within the one-time abstraction code and trigger a communication response upon input at the resource acceptance device.

9. The computer program product of claim 6, wherein receiving the communication indicating deployment of the one-time extraction code further comprises receiving the communication from the user device.

10. The computer program product of claim 6, wherein receiving the communication indicating deployment of the one-time extraction code further comprises receiving the communication from the resource acceptance device.

11. A computer-implemented method for one-time abstraction coding for resource deployment, the method comprising:

provide a computing system comprising a computer processing device and a non-transitory computer readable medium, where the computer readable medium comprises configured computer program instruction code, such that when said instruction code is operated by said computer processing device, said computer processing device performs the following operations:

extracting user resource vehicles for association with a one-time abstraction code and storing the association within a one-time abstraction code depository;

enrolling a user in the one-time abstraction coding for resource deployment and identifying user inputted criteria and threshold for each one-time abstraction code generated, wherein the user inputted criteria comprises a selection of a user account by the user;

deploying the one-time abstraction code to the user;

gathering authentication information from the user on a user device;

receiving a communication indicating deployment of the one-time abstraction code;

identifying the one-time abstraction code being input by the user at a resource acceptance device associated with an entity for completion of a user interaction event with the entity;

creating a communicable linkage with the resource acceptance device associated with the entity;

identifying the entity of the user interaction event based on the communication linkage from the input of the one-time abstraction code, and anonymously identify that the user has a loyalty account with the entity, wherein anonymously identifying comprises using a back end identification program to match the one-time abstraction code to the loyalty account associated with the entity;

transmitting resources from a system owned resource vehicle for completion of the user interaction event;

applying the loyalty account to the user interaction event; and reconciling resources from the user resource vehicles with the system owned resource vehicle and apply loyalty points to the loyalty account of the user for resource deployment during the user interaction event, wherein the user is anonymous to the resource acceptance device.

12. The computer-implemented method of claim 11, wherein creating the communicable linkage with the resource acceptance device associated with the entity further comprises receiving a resource amount required for completion of the user interaction event with the entity.

13. The computer-implemented method of claim 11, wherein communication instructions are embedded within the one-time abstraction code and trigger a communication response upon input at the resource acceptance device.

14. The computer-implemented method of claim 11, wherein receiving the communication indicating deployment of the one-time extraction code further comprises receiving the communication from the user device.

15. The computer-implemented method of claim 11, wherein receiving the communication indicating deployment of the one-time extraction code further comprises receiving the communication from the resource acceptance device.

* * * * *